United States Patent [19]
Falcoff et al.

[11] Patent Number: 5,020,845
[45] Date of Patent: Jun. 4, 1991

[54] OVERHEAD CONSOLE WITH DROP-DOWN COMPARTMENT

[75] Inventors: Monte L. Falcoff, Southfield; Edward G. Curtindale, Farmington Hills, both of Mich.

[73] Assignee: United Technologies Automotive, Dearborn, Mich.

[21] Appl. No.: 444,496

[22] Filed: Dec. 1, 1989

[51] Int. Cl.⁵ .............................................. B60R 5/00
[52] U.S. Cl. .................................. 296/37.7; 296/37.12; 224/311; 312/319; 292/DIG. 4
[58] Field of Search ........................... 296/37.7, 27.12; 224/311; 312/319; 292/DIG. 4

[56] References Cited
U.S. PATENT DOCUMENTS

| 4,596,427 | 6/1986 | Pflugfelder | 312/319 |
| 4,684,164 | 8/1987 | Durham | 296/37.7 |
| 4,867,498 | 9/1989 | Delphia et al. | 296/37.7 |

Primary Examiner—Robert R. Song

[57] ABSTRACT

An overhead console 5 which accommodates an electric garage door opener transmitter or similar signalling device, includes a drop-down compartment (50) stored in a housing (20). Guide means such as tracks (85) and detent (90) as well as damping means such as cams 110 and spring 115 assure smooth operation of the device.

9 Claims, 3 Drawing Sheets

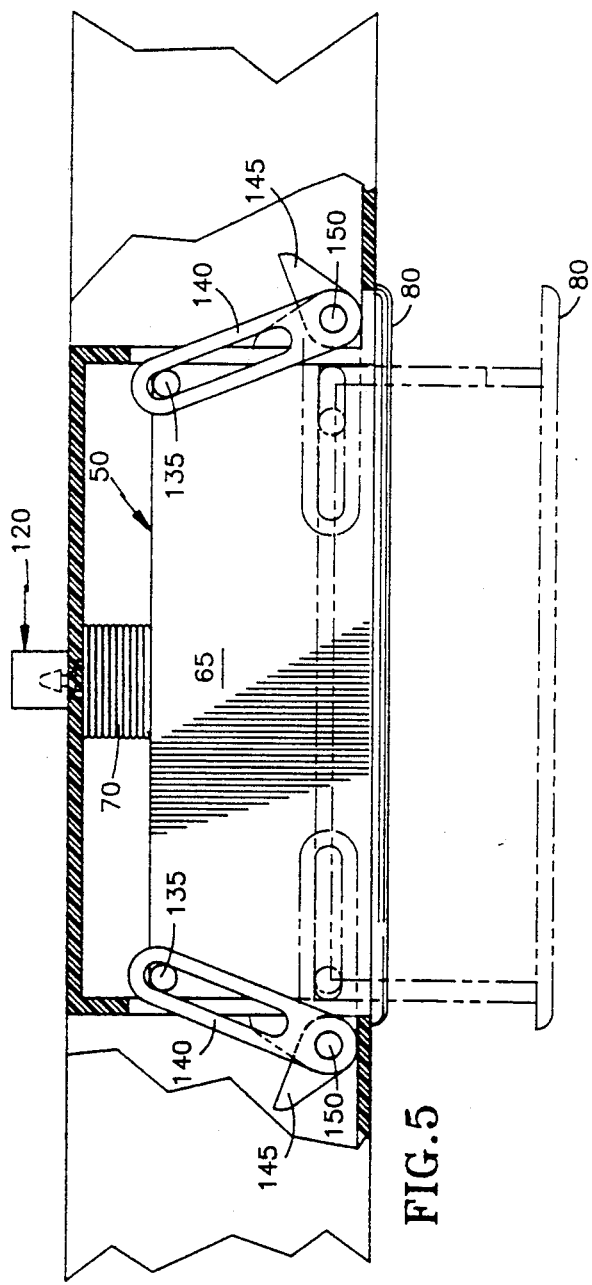
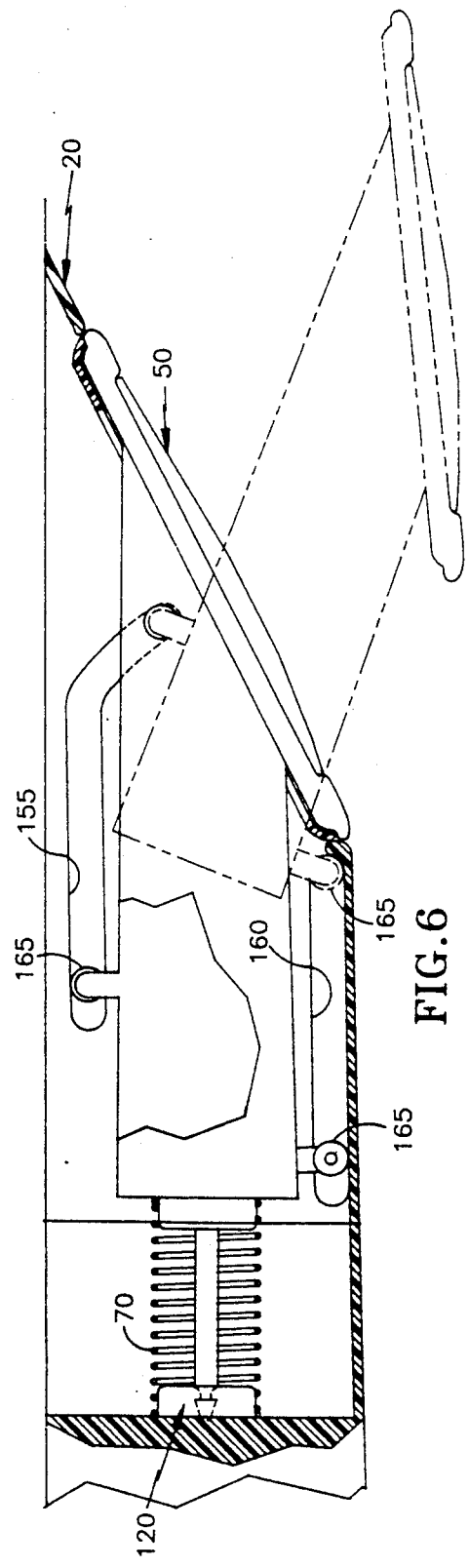

OVERHEAD CONSOLE WITH DROP-DOWN COMPARTMENT

DESCRIPTION

1. Technical Field

This invention relates generally to overhead consoles for motor vehicles and specifically to such overhead consoles which are particularly adapted for garage door remote controls and similar electronic signalling devices.

2. Background Art

As automotive design and technology evolve, more and more electronic accessories such as audio systems, computers, and the like find their way into modern automobile instrument panels. Accommodation of such accessories in the instrument panels leaves little room for extra storage therein. Today's sophisticated automobile purchaser demands interior storage which oftentimes cannot be fulfilled by the traditional instrument panel glove compartment. Thus, modern automobile interiors employ many diverse storage compartments such as bins and trays in such areas as the instrument panel, interior door panels, and center console located between the driver and passenger seats.

Recently, automobile ceilings have been explored as locations for storage compartments for such objects as garage door opener remote controls and similar remote control electronic signalling devices. An example of such a console specifically adapted to such electronic signalling devices is found in U.S. Pat. No. 4,595,228 to Chu. While the Chu console may be considered well suited for single-button garage door opener transmitters, it is not readily adaptable to modern transmitters which include multiple buttons by which one may electronically actuate such systems as a garage door opener, domestic interior lighting, locks, burglar alarms, and other various security or environmental systems. Accordingly, an overhead console for storing such modern electronic signalling devices and allowing occupants of a vehicle in which the console is employed to conveniently access the various buttons on such a device, is desirable.

DISCLOSURE OF THE INVENTION

In accordance with the present invention, an overhead console for the passenger compartment of a vehicle includes a housing mounted adjacent to the ceiling of the vehicle and a compartment which accommodates therewithin an electronic signalling device, the compartment being receivable within the housing for storage of the signalling device and partially removable from the housing (opened) by downward translational movement, for allowing access to the device by vehicle occupants. In one embodiment, the compartment comprises an open box which drops generally straight down from the housing by actuation of a "push-push" latching mechanism. Such a latching mechanism is actuated by pushing against the bottom of the moveable compartment which is exposed through an opening in the housing. Means are also provided for guiding in the downward movement of the compartment and damping such movement for smooth operation at a controlled rate of speed. The guide means may comprise such mechanisms as a detent associated with the housing, which is slidably received within tracks provided in the exterior of the compartment. Alternatively, the guide means may take the form of such mechanisms as pivotable links connected to both the compartment and housing as well as cam slots provided in the housing, within which roller type followers carried by the compartment are received. These latter two mechanisms also provide a measure of support of the compartment within the housing. The damping means may take the form of a spring disposed within the housing which frictionally engages one or more cams disposed on the outside of the compartment or any of various known viscous damping devices.

BRIEF DESCRIPTION OF DRAWING

FIG. 5 is a side elevation of an alternate embodiment of the overhead console of the present invention, portions thereof being sectioned and broken away to show details of construction; and FIG. 6 is a side elevation of another alternate embodiment of the overhead console of the present invention, portions thereof being sectioned and broken away to show details of construction.

BEST MODE FOR CARRYING OUT THE INVENTION

Figure 1:
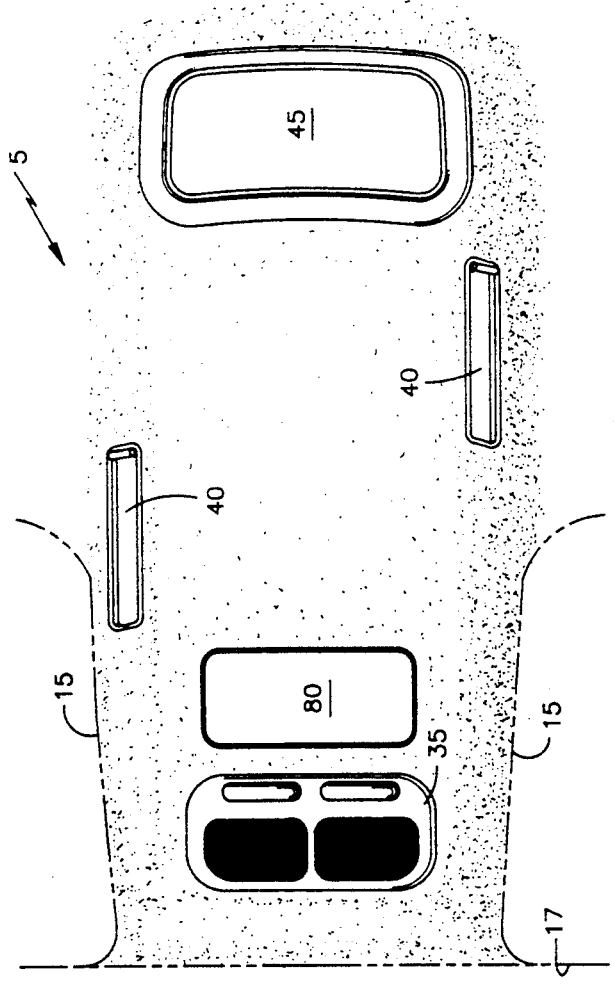
FIG. 1 is a plan view of the overhead console of the present invention.
Figure 2:
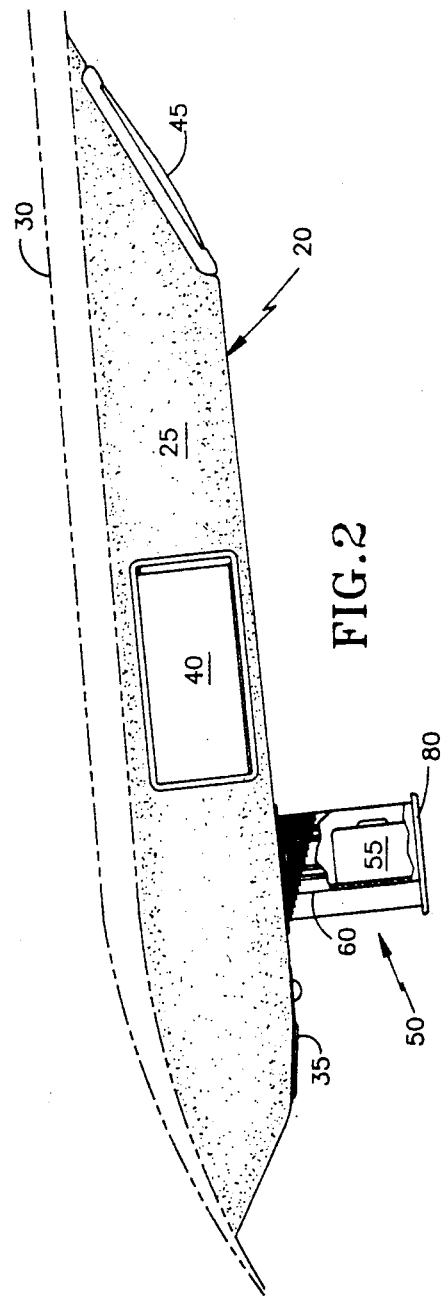
FIG. 2 is a side elevation of the overhead console shown in FIG. 1 with the portion of a moveable compartment employed in the console sectioned and broken away to show the interior thereof.

Referring to FIGS. 1 and 2, the overhead console 5 of the present invention is shown at the forwardmost portion of an automobile ceiling 10. For reference purposes, the vehicle's sunvisors are shown in phantom at 15 and the forward edge of the vehicle's roof at 17.

The overhead console comprises a housing 20 which may be covered with headliner material 25. The headliner may be material applied thereto or molded into a contour in which housing 20 may be received. The housing and the various other structural members associated with the invention herein are conveniently molded from any of many suitable plastics and may be attached to the vehicle's roof (shown in phantom in FIG. 2 at 30) at any of the roof's headers (ribs) in a manner such as that disclosed in U.S. patent application Ser. No. 07/388,269 filed Aug. 1, 1989. The housing may be provided with various accessories such as a lamp module 35 and various storage compartments such as side facing compartments 40 and rearwardly facing compartment 45.

Figure 3:
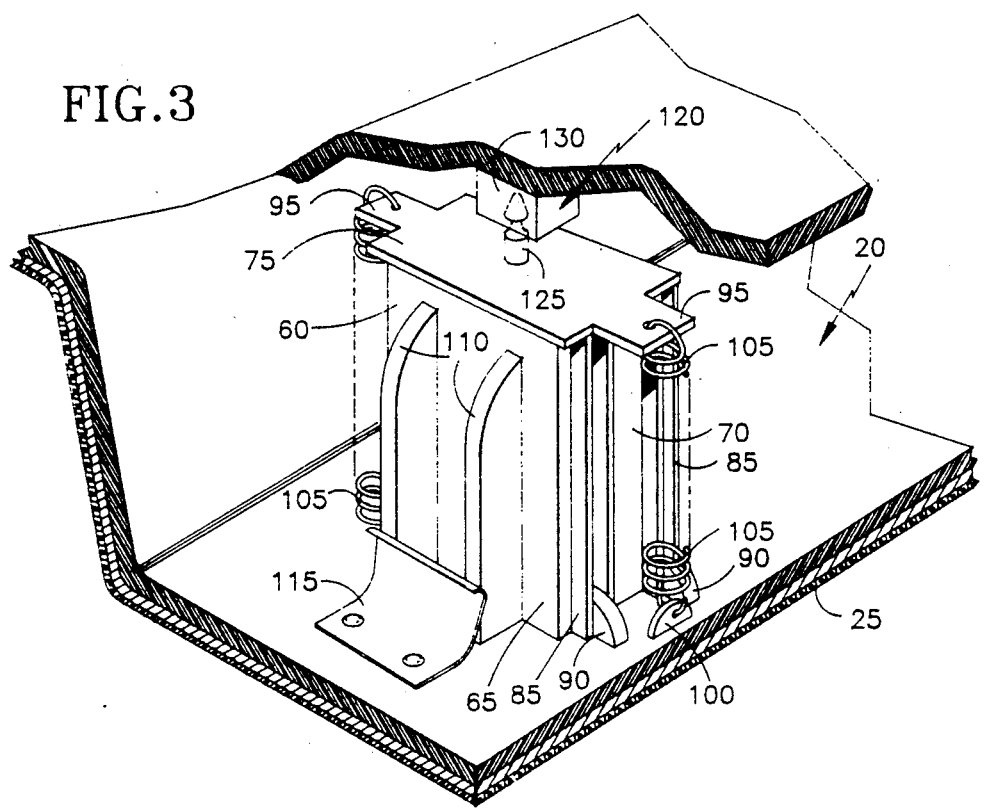
FIG. 3 is a perspective view of the interior of the overhead console showing the moveable compartment latched in a stored position therewithin, portions of the console being sectioned and broken away to show details of the construction thereof.
Figure 4:
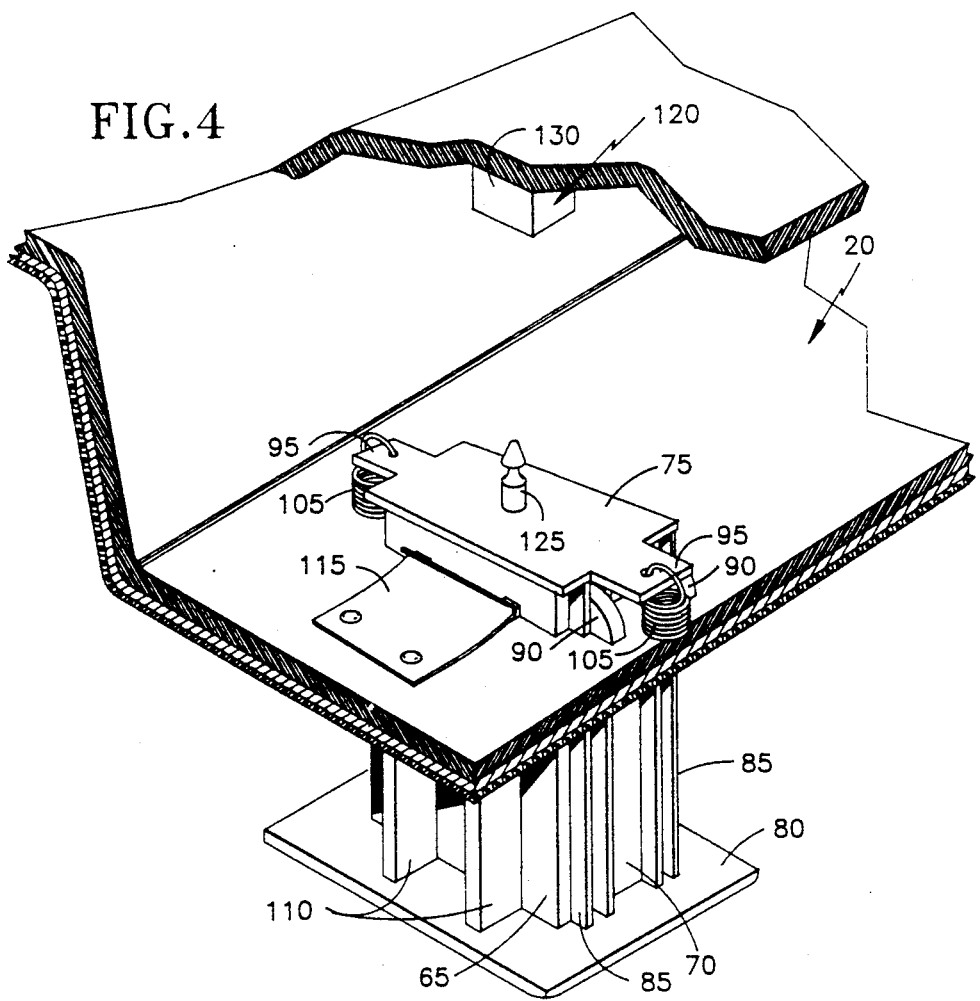
FIG. 4 is a perspective view similar to FIG. 3, but showing the compartment opened from the interior of the console.

Referring particularly to FIGS. 2, 3 and 4, the console includes a drop-down compartment 50 which receives therewithin an electronic signalling device 55 such as a remote controller for a garage door opener or other domestic security or environmental systems. Device 55 may be fixed within compartment 50 by any of various known mechanical or adhesive fasteners. The compartment comprises a box shaped structure open at the rear thereof whereby the electronic signalling device is readily accessed by the occupants of the vehicle when the compartment is generally from the interior of the housing as illustrated in FIGS. 2 and 4. The compartment comprises a wall structure 60 including a forward wall 65, side walls 70, upper wall 75 and lower wall 80. As best seen in FIG. 1, lower wall 80 is exposed to the vehicle passenger compartment through an opening provided in the housing and headliner for release of a latch mechanism to be described in further detail hereinafter.

Still referring to FIGS. 3 and 4, the side walls 70 of the compartment are provided with exterior channels 85 within which detents 90 formed in the bottom of the housing interior are slidably received to guide the compartment downwardly to the positions shown in FIGS. 2 and 4 while maintaining alignment of the compartment with housing 20. Upper wall 75 of compartment 50 is provided with apertured lugs 95 in vertical alignment with apertured lugs 100 formed proximally to lugs 90 at the bottom of the housing interior. Coil springs 105 connected to the compartment and housing at lugs 95 and 100 bias the compartment downwardly toward the position shown in FIGS. 2 and 4. Backwall 60 is provided at the outer surface thereof with cams 110 which are engaged by a friction leaf spring 115 attached to the bottom of housing 20 by rivets or similar fasteners. Those skilled in the art will appreciate that the amount of damping provided by the contact spring 115 with cams 110 will be proportional to the amount of bend of the spring as the spring slides over the cams during the downward movement of the compartment. Thus, it will be apparent from the shape of cams 110 that the greatest damping of downward movement will occur at the start of compartment movement from the stored position shown in FIG. 3 wherein springs 70 apply the greatest opening force. As the compartment moves downwardly, springs 105 relax and less damping force is needed so that the upper ends of cams 110 allow leaf spring 115 to relax.

Compartment 50 is maintained in its upper (stored) position by a "push-push" latching mechanism indicated generally at 120. Such latching mechanisms are well known in the art and are frequently employed in conjunction with doors or similar pivotable cover panels without handles. As the designation "push-push" indicates, the mechanism is latched and unlatched by successive pushing actuation of a detent associated therewith. Thus, upper wall 75 of compartment 50 is provided thereon with a detent 125 extending upwardly therefrom and received within a suitable catch 130, the details of the construction thereof being irrelevant to the invention herein. In the compartment's stored position, catch 130 grips detent 125 and vertically restrains the compartment from downward movement. Pushing upwardly on lower wall 80 of compartment 50 moves detent 125 upwardly causing the catch to release the detent thereby allowing the compartment to drop under its own weight and the bias of springs 70 to its opened position shown in FIG. 4. To retract the compartment to its stored position, the compartment is pushed upwardly from bottom wall 80 thereof to re-engage detent 125 with catch 130 thereby, restraining the compartment within housing 20.

Referring to FIG. 5, a first alternate embodiment of the overhead console of the present invention is shown. In this embodiment, a compartment 50 open at the rear thereof to expose an electronic signalling device (not shown) is stored in a housing 20, being latched therewithin by push-push latch 120. The compartment is biased downwardly by coil spring 70. Back wall 65 is provided with pins 135 received within slotted links 140 which, with stops 145, are pivotally mounted on pins 150. The links extend through slots in the housing sidewalls. As shown in phantom in FIG. 5, pushing upwardly on bottom wall 80 from the latched position of the compartment unlatches the compartment which drops under its own weight and the bias of spring 70. Links 140 pivot inwardly and roll on the floor of the housing 20 to guide the compartment through the opening in housing. The stops 145 rotate inwardly with the links, engaging the sidewalls of the housing to restrain the links which support the compartment in its opened position. Suitable damping means such as the cams and friction spring described hereinabove, which, for clarity are not shown, may also be employed.

Referring to FIG. 6, a second alternate embodiment is shown. In this embodiment, cam slots 155 and 160 in the sidewalls of the housing, receive roller type followers 165 therewithin which are carried by compartment 50. The compartment is unlatched by pushing horizontally thereon against spring 70 thereby unlatching the compartment at latch 120. Spring 70 forces the compartment horizontally outwardly, as the rollers follow cam slots 160 and the horizontal portion of slot 155. Further horizontal movement of the compartment under the biasing force of spring 70 causes the compartment to drop as the upper roller follows the inclined portion of cam slot 155. Again, while a suitable damping mechanism may be employed, for clarity, none is shown in FIG. 6.

From the foregoing it will be seen that the overhead console of the present invention provides convenient drop-down accessibility of an electronic signalling device such as a garage door opener or the like. The push-push type latch eliminates the need for grab handles and the like while the various guide means illustrated, assure smooth operation and maintenance of the alignment of the compartment with the housing. The damping means further enhances smooth operation. The rearwardly open compartment can be sized to accommodate such signalling devices of any size or shape and therefore is not limited to use with a single button garage door opener.

While specific embodiments of the present invention have been described and illustrated, it will be readily apparent to those skilled in the art that various modifications may suggest themselves. Thus, while a friction spring and cams have been described as providing damping of the downward movement of the compartment, it will be readily appreciated that any of various known viscous damping mechanisms may, be connected between the compartment and housing with suitable means such as linkages, gearsets or the like to provide suitable compartment damping. Furthermore, while compartments of various sizes and shapes have been illustrated it will be understood that the invention is not so limited, the geometry of the compartments being dictated by the anticipated electronic signalling devices to be employed therewith. Similarly, configurations other than those of the links and slotted cams illustrated in FIGS. 5 and 6, may be employed without departing from the present invention. Accordingly, it is intended by the following claims to cover these alternate constructions and any others which fall within the true spirit and scope of this invention.

Having thus described the invention, what is claimed is:

1. An overhead console of the passenger compartment of a motor vehicle or the like having a roof, said overhead console being characterized by:
- a housing for mounting within said passenger compartment adjacent to the interior of said vehicle roof, said housing including an opening on the underside thereof;
- a compartment for accommodating therewithin an electronic signaling device or the like, said compartment being receivable within said housing and at least partially removable therefrom by the downward translation of said compartment, for exposure of the contents thereof to an occupant of said vehicle, said compartment comprising a wall structure including a lower wall accessible to the occupant of said vehicle through said opening;
- means disposed in said housing for guiding said compartment in said translation; and
- means associated with said housing and compartment for selectively latching said compartment to said housing, said latching means being actuatable by pushing said compartment upwardly for both releasing said compartment from a stored position within said compartment and latching said housing in said stored position;
- said latching means comprising a catch disposed within said housing above said compartment; and
- a detent interchangeable with said catch and carried by said compartment at an upper surface of the exterior of said wall structure.

2. The overhead console of claim 1 characterized by said downward translation of said compartment being essentially vertical.

3. The overhead console of claim 2 characterized by at least one spring connected to, and disposed between an upper portion of said compartment and a lower portion of said housing, for biasing said compartment downwardly to enhance said vertical translation of said compartment.

4. An overhead console of for the passenger compartment of a motor vehicle or the like having a roof, said overhead console being characterized by:
- a housing for mounting within said passenger compartment adjacent to the interior of said vehicle roof;
- a compartment for accommodating therewithin an electronic signaling device or the like, said compartment being receivable within said housing and at least partially removable therefrom by the downward translation of said compartment, for exposure of the contents thereof to an occupant of said vehicle; and
- tracks formed in the exterior of said compartment on opposite sides thereof; and
- detents provided in the interior of said housing and slidably receivable within said tracks for maintaining the alignment of said tracks and therefore said compartment with said housing.

5. The overhead console of claim 1 characterized by means associated with said housing and said compartment for damping the downward translation of said compartment during said partial removal thereof from said housing.

6. An overhead console of for the passenger compartment of a motor vehicle or the like having a roof, said overhead console being characterized by:
- a housing for mounting within said passenger compartment adjacent to the interior of said vehicle roof;
- a compartment for accommodating therewithin an electronic signaling device or the like, said compartment being receivable within said housing and at least partially removable therefrom by the downward translation of said compartment, for exposure of the contents thereof to an occupant of said vehicle; and
- means disposed in said housing for guiding said compartment in said translation
- means associated with said housing and compartment for damping the downward translation of said compartment during said partial removal thereof from said housing;
- said damping means comprising at least one cam disposed on the exterior of said compartment and a friction spring fixed to said housing and slidably engageable with said cam as said compartment translates downwardly during said partial removal thereof from said housing.

7. The overhead console of claim 1 characterized by said compartment comprising a box-shaped structure being open at the rear thereof for access to the contents thereof.

8. An overhead console of for the passenger compartment of a motor vehicle or the like having a roof, said overhead console being characterized by:
- a housing for mounting within said passenger compartment adjacent to the interior of said vehicle roof;
- a compartment for accommodating therewithin an electronic signaling device or the like, said compartment being receivable within said housing and at least partially removable therefrom by the downward translation of said compartment, for exposure of the contents thereof to an occupant of said vehicle; and
- means disposed in said housing for guiding said compartment in said translation, said guide means comprising a plurality of links pivotally connected to said compartment and housing for supportably connecting said compartment to said housing.

9. An overhead console of for the passenger compartment of a motor vehicle or the like having a roof, said overhead console being characterized by:
- a housing for mounting within said passenger compartment adjacent to the interior of said vehicle roof;
- a compartment for accommodating therewithin an electronic signaling device or the like, said compartment being receivable within said housing and at least partially removable therefrom by the downward translation of said compartment, for exposure of the contents thereof to an occupant of said vehicle; and
- means disposed in said housing for guiding said compartment in said translation, said guide means comprising at least one cam provided in said housing and a follower fixed to said compartment and movable along said cam as said compartment translates downwardly for guiding said compartment in said translation.

* * * * *